United States Patent Office 3,055,753
Patented Sept. 25, 1962

3,055,753
METALLURGICAL PROCESSES
Richard K. Matuschkovitz, Chicago, and Henning J. Christensen, Addison, Ill., assignors to Chemetron Corporation, Chicago, Ill., a corporation of Delaware
No Drawing. Filed Jan. 13, 1961, Ser. No. 82,404
5 Claims. (Cl. 75—58)

This invention relates to a method of improving the properties of grey iron by treatment of molten grey iron with calcium carbide and amorphous carbon. More particularly, this invention relates to improving the properties of grey iron by changing the graphite structure of the iron from D or E type structure into an A type structure, changing the matrix from a ferritic type matrix into a uniform pearlitic type matrix and reducing the chill depth of the metal, whereby an increase in tensile strength results due to uniformity of the structure of the iron.

Grey iron is conventionally produced in a cupola, which is a shaft furnace where iron and steel scrap are melted with fluxing materials. Heat for the melting is provided by coke which combusts with air blown into the cupola through tuyere openings. A cupola has a drop bottom, a slag and tap hole and is charged from the top. The cupola is filled with coke to some distance above the tuyere level. After this coke bed is burned in and the coke is white hot, charging begins and the melting operation is started. Alternate layers of limestone, coke and scrap and pig iron are charged and the coke replaces that which burns out during the operation. An air blast is introduced through the tuyeres and a constricted area right above the tuyere level is the hottest zone of the cupola, that is, it is the melting zone. As the iron charge descends in the cupola, the metal becomes soft and finally melts in the melting zone. Liquid superheated iron flows around the coke pieces in the coke bed and is collected in the well of the cupola from where it is tapped through the tap hole. Slag that is formed remains, because of its lower density, on top of the iron that is tapped through the tap hole. In certain construction of the cupola the tap hole sometimes also serves as the slag hole.

Depending upon the air input rate, the iron to coke ratio, the charge composition, the humidity of the air and other variables, the iron will have a certain composition. In general the iron charge will gain in its carbon, sulfur and phosphorus content and will lose in its silicon and manganese content. The pickup or loss of the above elements depends directly upon the melting temperature which in turn depends upon the air input rate and the combustible coke available.

Two types of cast iron are produced by controlling the rate of solidification. White cast iron is so rapidly cooled during casting that the entire quantity of carbon is retained in the form of very hard iron carbide or cementite, and the balance in the eutectoid pearlite produced from the primary austenite. Grey cast iron contains all of the eutectic carbon and part of the carbon as graphite formed by the transformation of the austenite. The structure consists of a matrix of pearlite in which the graphite flakes are embedded. Other factors being equal, iron with a pearlitic matrix is more wear-resistant than one with ferritic matrix.

In cooling grey cast iron it is important that the solidification takes place in a certain way. Cooling rate, distribution of solidification nuclei and composition of the metal have a most pronounced effect on the structure of the casting formed by the solidification process. The micro structure of the grey iron is the determining factor in classifying the casting as good or bad. Casting structure determines the ease of machinability, brittleness and other physical properties, such as tensile strength, deflection and hardness. The matrix of grey iron can be formed of ferrite, pearlite or a mixture of both. Embedded in this matrix are graphite flakes and also very often cementite, steadite and sulfides. The graphite flakes are the excess of carbon which cannot be held in solid solution in grey iron. Depending upon their size and form, the graphite flakes are classified as types A, B, C, D and E and sizes 1–8. It will be understood that the different matrices, such as pearlite, ferrite or a combination of both have different compositions and consequently different hardnesses. The same is true of the different embedded phases, such as cementite and steadite. All of these different structures consist of carbon and iron in certain percentages and, in the case of steadite, also contain a certain percentage of phosphorus.

Grey iron when tapped from a cupola has a certain content of carbon, manganese, silicon, sulfur, phosphorus and iron. Such grey iron according to the equilibrium phase should solidify into a pearlitic matrix and a type A distribution. Upon examination of the micro structure of a particular casting, a hard cementite ring (chill) on the periphery is noted and a mottled structure of the rest of the casting is observed which consists of a pearlitic-ferritic matrix containing cementite and dispersed small graphite flakes. This iron is very difficult to machine because of inconsistencies in the structure. The addition of certain inoculants, that is, alloys consisting of ferrosilicon, silicon-zirconium, calcium-silicon and the like and/or the process of very slow cooling provides a machinable casting with good physical properties. These inoculants are expensive and increase the cost of the casting considerably. Inoculants effect the so-called "eutectic cell" size and the solubility of the carbon in the melt. A large eutectic cell forms small broken-up graphite flakes (graphite types D and E) whereas small eutectic cells tend to form larger graphite flakes (type A). A low sulfur content in the grey iron will help in the formation of a pearlitic matrix (type A graphite) and reduction in chill depth.

Every grey iron foundry attempts to produce castings that require use of a minimum amount of alloying materials, but still meet the specification for higher physical properties. Most of the alloys used in grey iron foundries as ladle inoculants, especially those having high silicon content, permit attainment of the desired metal structures. These inoculants, however, are very expensive and increase the costs of the castings significantly.

It is known that the addition of calcium carbide in high concentration (20–30 lbs. per ton) will desulfurize grey iron and incidentally improve its structure. The use of calcium carbide in high concentration presents difficulties, however. The slag evolving from this extensive calcium carbide addition causes a serious problem for the foundry man because the slag has to be removed. For this reason, many foundries attempt to bring down the sulfur level of their grey iron with the addition of substances, such as soda ash or calcium carbide. These materials are added after the iron is tapped from the cupola. Soda ash has a very harmful effect on the ladle linings and is therefore seldom used.

It is an object of this invention to provide a method for improving the properties of cast iron and particularly grey iron by introduction of calcium carbide and amorphous carbon into the molten metal. It is another object of this invention to improve the structure of cast iron by converting the graphite structure from D or E type to A type. It is another object of this invention to improve the properties of cast iron by changing a ferritic matrix into a pearlitic matrix by the addition of calcium carbide and amorphous carbon. A further object of this invention is to substantially reduce the chill depth of cast iron by the addition of amorphous carbon and calcium carbide to the molten metal. A further object of the invention is to improve the structure of grey iron and its physical properties, particularly tensile strength, without first desulfurizing the molten iron. These and other objects are apparent from and are achieved in accordance with the following disclosure.

We have discovered a procedure for improving the properties and structure of grey iron which avoids the necessity of desulfurization in order to achieve favorable results. Broadly, our invention comprises the addition of calcium carbide and amorphous carbon to molten cast iron. Maximum amounts of approximately two pounds of calcium carbide and two pounds of amorphous carbon per ton are effective in improving the structure and properties of the iron. Either or both of the materials (amorphous carbon and calcium carbide) can be added to the pouring streams, or to the holding ladle, or can be injected beneath the surface of the molten iron. The iron is at a temperature of at least 2550° F. or above during the treatment. When this process is used there is no sulfur reduction. The amorphous carbon is added preferably by hand to the stream of molten iron as it is tapped from the cupola. The calcium carbide is injected into the molten iron by means of a dispensing unit through a stream of inert gas such as nitrogen. The injection of approximately two pounds of calcium carbide takes about twenty to forty seconds. The calcium carbide, in the form of large pieces, can also be added by hand to a cupola fore hearth in the same total amounts and at certain time intervals. After this treatment the iron is ready to be poured.

The amorphous carbon can be added separately followed by the injection of the calcium carbide or the amorphous carbon can be injected with the calcium carbide. For injection a carrier gas, such as nitrogen, carbon dioxide or monatomic gas can be used. During the treatment of the iron with amorphous carbon and calcium carbide the temperature of the iron is maintained at 2640° F. to 2850° F. The preferred proportions are from ½ to 2 lbs. of carbon per ton of iron and from ¼ to 2 lbs. of calcium carbide per ton of iron.

The percentage of pig iron in the original cupola charge can be greatly reduced as a result of the calcium carbide treatment, thereby effecting substantial savings. For instance, a normal cupola charge is 40% pig iron, 50% scrap iron returns and 10% steel. When calcium carbide is used, however, the charge can be 25% pig iron, 65% scrap iron returns and 10% steel. The use of the cheaper scrap in lieu of pig iron substantially improves the overall efficiency of the method.

A further advantage of this invention is that the necessity of using ferrosilicon and other inoculants to produce grey iron is very substantially reduced by the use of calcium carbide and the fluidity of the iron is substantially increased.

Grey iron treated in accordance with this invention exhibits the following improvements: There is a reduction in chill depth; a change in the graphitic structure from types D and E graphite to 100% type A graphite; a change in the ferritic matrix to a pearlitic matrix; a much finer grain size; and improvement in fluidity of the metal and in physical properties, such as an increase in tensile strength by 8,000 to 10,000 p.s.i. In addition the size of the pig iron charge in the cupola can be reduced and cheaper scrap can be used as a substitute. The inoculation of the grey iron with alloys containing silicon, calcium or zirconium metals in order to reduce the chill and obtain a desirable grey iron structure can be eliminated or reduced.

The invention is disclosed in further detail by means of the following examples which are provided for purposes of illustration only. It will be readily understood that numerous modifications in operating conditions and quantities of materials may be made in the general disclosure of this invention without departing therefrom.

*Example 1*

To 1840 lbs. of molten grey iron as tapped from the cupola containing 3.45% total carbon, 2.94% graphite, 0.51% combined carbon, 0.128% sulfur and 0.058% phosphorus was added 2 lbs. of amorphous carbon as the metal was tapped from the cupola at a temperature of 2800° F. When the metal was in a ladle lined with an acid refractory lining, 2 lbs. of calcium carbide was injected beneath the surface of the molten metal by means of a nitrogen stream through a graphite lance over a period of 30 seconds. The grey iron so produced had 3.42% total carbon, 2.82% graphite, 0.60% combined carbon, 0.126% sulfur and 0.055% phosphorus. The chill depth of a specimen of the grey iron before treatment was 14/32 inch and after treatment was 5/32 inch. Photomicrographs of the grey iron before treatment at a magnification of 120 showed graphite of type D only. Photomicrographs after the addition of 2 lbs. of amorphous carbon showed graphite of types B and D while photomicrographs after the addition of both 2 lbs. of carbon and 2 lbs. of calcium carbide showed only graphite of type A.

*Example 2*

To a stream of 1840 lbs. of grey iron as tapped from a cupola was added 1½ lbs. of amorphous carbon by hand. Into the molten metal in an acid-lined ladle, 2 lbs. of 14 mesh dust-free calcium carbide was injected in a nitrogen stream through a graphite lance over a period of 30 seconds, the temperature of the metal being 2770° F. Before treatment the grey iron contained 3.36% total carbon, 2.68% graphite, 0.68% combined carbon, 0.132% sulfur, 0.55% manganese and 0.14% chromium. After the carbon addition the iron contained 3.32% total carbon, 2.64% graphite, 0.68% combined carbon, 0.136% sulfur, 0.56% manganese and 0.13% chromium. After the calcium carbide injection the metal contained 3.50% total carbon, 2.58% graphite, 0.92% combined carbon, 0.130% sulfur, 0.58% manganese and 0.14% chromium. The chill depth of the metal before treatment was 10/32 inch. After treatment with carbon the chill depth was 9/32 inch and after treatment with calcium carbide it was 4/32 of an inch.

*Example 3*

About 1500 lbs. of molten grey iron was tapped into a preheated holding ladle from a cupola which had been charged with 25% pig iron, 65% scrap iron returns and 10% steel. A sample of the base iron was taken and a photomicrograph showed that the graphitic structure consisted of type D and E graphite and the chill depth was 8/32 inch. About 370 lbs. of iron was poured out of the holding ladle into a transfer ladle while 1 lb. of amorphous carbon was added to the stream during the pouring. A photomicrograph showed that some type A graphite was formed while type D and E graphite remained. The chill depth was reduced to 3/32 inch. One lb. of calcium carbide was injected into the melt in the holding ladle via nitrogen stream through a graphite lance. A photomicrograph showed about 98% type A graphite in a predominently pearlitic matrix. The chill depth was 3/32 inch.

*Example 4*

From a cupola charged with 15% pig iron, 70% scrap iron returns and 15% steel about 1500 lbs. of iron was tapped into a preheated holding ladle. Photomicrographs of a sample of the base iron showed mostly type D and type E graphite and a chill depth of 8/32 inch. Five lbs. of calcium carbide was added to the iron stream from the cupola and a specimen of this iron showed type A and some type B graphite with some type D and E graphite. The chill depth was 7/32 inch. 170 lbs. of iron was poured into a transfer ladle and 1 lb. of amorphous carbon was added by hand to the stream. A photomicrograph of a specimen of this iron showed 80% type A graphite and a chill depth of 1/32 inch. A sample was taken from the transfer ladle after the iron was poured and a photomicrograph showed nearly 100% type A graphite and a chill depth of 2/32 inch. More iron from the holding ladle was poured into the transfer ladle and 1 lb. of carbon was added during the pouring. A photomicrograph of a specimen of this iron showed nearly 100% type A graphite and a chill depth of zero.

*Example 5*

1000 lbs. of molten grey iron was tapped from a cupola into a holding ladle. One lb. of amorphous carbon was added to the stream by hand during the tapping. Then 1 lb. of calcium carbide was injected into the molten metal in the ladle by entrainment in a nitrogen stream. The base metal before treatment contained 3.09% total carbon, 2.18% silicon and 0.120% sulfur and had a tensile strength of 42,500 lbs. After treatment with amorphous carbon and calcium carbide it contained 3.20% total carbon, 2.20% silicon and 0.126% sulfur and had a tensile strength of 50,900 lbs.

In another run, 7000 lbs. of grey iron was treated with 7 lbs. of amorphous carbon by hand during transfer to a holding ladle. Then 5 lbs. of calcium carbide was injected into the melt by nitrogen. Before treatment, a specimen of the iron had a tensile strength of 39,600 lbs. After treatment with amorphous carbon and calcium carbide the iron had a tensile strength of 47,700 lbs.

What is claimed as new and is desired to be secured by Letters Patent of the United States is:

1. Method of improving the structure and physical properties of iron which comprises adding to molten iron at least one-quarter pound and not more than about two pounds of calcium carbide and at least one-half pound and not more than about two pounds of amorphous carbon per ton of iron.
2. The method of claim 1 wherein the molten iron is at a temperature of at least about 2550° F.
3. The method of claim 2 wherein the amorphous carbon is added to a stream of molten iron.
4. The method of claim 3 wherein the calcium carbide is added by entrainment in a stream of inert gas injected below the surface of a pool of molten iron.
5. Method of claim 3 wherein the calcium carbide is added to a pool of molten iron.

References Cited in the file of this patent

UNITED STATES PATENTS

| | | |
|---|---|---|
| 2,157,390 | Priestley | May 9, 1939 |
| 2,661,281 | Morrogh | Dec. 1, 1953 |
| 2,747,990 | Morrogh | May 29, 1956 |